(12) United States Patent
Ijeri et al.

(10) Patent No.: US 10,793,725 B2
(45) Date of Patent: *Oct. 6, 2020

(54) SOL-GEL COATING COMPOSITIONS INCLUDING CORROSION INHIBITOR-ENCAPSULATED LAYERED DOUBLE HYDROXIDE AND RELATED PROCESSES

(71) Applicant: The Boeing Company, Chicago, IL (US)

(72) Inventors: Vijaykumar S. Ijeri, Bangalore (IN); Om Prakash, Bangalore (IN); Stephen P. Gaydos, St. Louis, MO (US); Raghavan Subasri, Hyderabad (IN); Kalidindi Ramachandra Soma Raju, Hyderabad (IN); Dendi Sreenivas Reddy, Hyderabad (IN)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/355,531

(22) Filed: Mar. 15, 2019

(65) Prior Publication Data

US 2019/0211214 A1 Jul. 11, 2019

Related U.S. Application Data

(63) Continuation of application No. 15/231,654, filed on Aug. 8, 2016, now Pat. No. 10,246,593.

(60) Provisional application No. 62/364,657, filed on Jul. 20, 2016.

(51) Int. Cl.
| | |
|---|---|
| *C07C 45/80* | (2006.01) |
| *C09D 5/08* | (2006.01) |
| *C09D 5/00* | (2006.01) |
| *B05D 1/02* | (2006.01) |
| *B05D 1/18* | (2006.01) |
| *B05D 3/06* | (2006.01) |
| *B05D 5/00* | (2006.01) |
| *B05D 7/14* | (2006.01) |
| *C23C 26/00* | (2006.01) |

(52) U.S. Cl.
CPC .............. *C09D 5/086* (2013.01); *B05D 1/02* (2013.01); *B05D 1/18* (2013.01); *B05D 3/067* (2013.01); *B05D 5/00* (2013.01); *B05D 7/14* (2013.01); *C09D 5/00* (2013.01); *C09D 5/084* (2013.01); *C23C 26/00* (2013.01)

(58) Field of Classification Search
USPC ......................................... 528/176; 524/588
See application file for complete search history.

(56) References Cited

U.S. PATENT DOCUMENTS

| | | |
|---|---|---|
| 4,753,827 A | 6/1988 | Yoldas et al. |
| 4,754,012 A | 6/1988 | Yoldas et al. |
| 4,814,017 A | 3/1989 | Yoldas et al. |
| 5,328,975 A | 7/1994 | Hanson et al. |
| 5,482,544 A | 1/1996 | Okuda et al. |
| 5,939,197 A | 8/1999 | Blohowiak et al. |
| 5,958,578 A | 9/1999 | Blohowiak et al. |
| 6,037,060 A | 3/2000 | Blohowiak et al. |
| 6,077,885 A | 6/2000 | Hager et al. |
| 6,150,033 A | 11/2000 | Mosser et al. |
| 6,169,119 B1 | 1/2001 | Ryang et al. |
| 6,579,472 B2 | 6/2003 | Chung et al. |
| 6,605,365 B1 | 8/2003 | Krienke et al. |
| 7,052,592 B2 | 5/2006 | Edigaryan |
| 8,592,042 B2 | 11/2013 | Blohowiak et al. |
| 9,670,376 B1 | 6/2017 | Dawley |
| 2001/0047665 A1 | 12/2001 | Zhang et al. |
| 2002/0165339 A1 | 11/2002 | Zha et al. |
| 2003/0024432 A1 | 2/2003 | Chung et al. |

(Continued)

FOREIGN PATENT DOCUMENTS

| | | |
|---|---|---|
| DE | 19718891 | 11/1998 |
| DE | 102009001372 | 9/2010 |

(Continued)

OTHER PUBLICATIONS

"Addressing Chemicals of Concern," European Chemicals Agency (ECHA), retrieved at http://echa.europa.eu/addressing-chemicals-of-concern, Jun. 22, 2012, 1 page.

(Continued)

*Primary Examiner* — Terressa Boykin
(74) *Attorney, Agent, or Firm* — Haynes and Boone, LLP

(57) ABSTRACT

A Zn—Al layered double hydroxide (LDH) composition is added to a solution including a corrosion inhibitor and stirred, and a precipitate of the solution is collected, washed, and dried to form a corrosion inhibiting material (CIM), in which the LDH composition is intercalated with the corrosion inhibitor. An inorganic CIM and/or an organic CIM may be formed. The organic CIM may be added to a sol-gel composition to form an organic CIM-containing sol-gel composition, and the inorganic CIM may be added to a sol-gel composition to form an inorganic CIM-containing sol-gel composition. Further, the organic CIM-containing sol-gel composition may be applied on a substrate (e.g., an aluminum alloy substrate) to form an organic CIM-containing sol-gel layer and cured by ultraviolet (UV) radiation, the inorganic CIM-containing sol-gel composition may be applied on the substrate to form an inorganic CIM-containing sol-gel layer and cured by UV radiation, and the sol-gel layers may be thermally cured.

20 Claims, 8 Drawing Sheets

(56) References Cited

U.S. PATENT DOCUMENTS

| | | |
|---|---|---|
| 2003/0144469 A1 | 7/2003 | Kauffman et al. |
| 2004/0024835 A1 | 2/2004 | Howard |
| 2004/0107989 A1 | 6/2004 | Woll et al. |
| 2005/0048298 A1 | 3/2005 | Howell et al. |
| 2006/0009536 A1 | 1/2006 | Jang et al. |
| 2006/0230476 A1 | 10/2006 | Atanasoska et al. |
| 2007/0125451 A1 | 6/2007 | Smith et al. |
| 2008/0058489 A1 | 3/2008 | Edelmann et al. |
| 2008/0111027 A1 | 5/2008 | Blohowiak et al. |
| 2008/0245260 A1 | 10/2008 | Campazzi et al. |
| 2009/0078153 A1 | 3/2009 | Shchukin et al. |
| 2009/0104362 A1 | 4/2009 | Jang et al. |
| 2009/0148711 A1 | 6/2009 | Le Blanc et al. |
| 2009/0186053 A1 | 7/2009 | Meyer et al. |
| 2009/0192251 A1 | 7/2009 | Chung et al. |
| 2009/0272293 A1 | 11/2009 | Ono |
| 2010/0316447 A1 | 12/2010 | Schmidt et al. |
| 2010/0330380 A1 | 12/2010 | Colreavy et al. |
| 2011/0207049 A1 | 8/2011 | Tillema et al. |
| 2011/0207206 A1 | 8/2011 | Shelekhov |
| 2012/0298923 A1 | 11/2012 | Lee et al. |
| 2013/0034702 A1 | 2/2013 | Bockmeyer et al. |
| 2013/0145957 A1 | 6/2013 | Shchukin et al. |
| 2014/0322540 A1 | 10/2014 | Ferguson et al. |
| 2015/0079298 A1 | 3/2015 | Ferreira et al. |
| 2015/0125690 A1 | 5/2015 | Ryu et al. |
| 2015/0337171 A1 | 11/2015 | Melzer et al. |
| 2015/0376420 A1 | 12/2015 | Hintze-Bruning et al. |
| 2016/0089334 A1 | 3/2016 | Nakayama et al. |
| 2017/0009034 A1 | 1/2017 | Suzuki et al. |
| 2017/0020331 A1 | 1/2017 | Berrux |
| 2018/0022936 A1 | 1/2018 | Ijeri et al. |
| 2018/0022937 A1 | 1/2018 | Ijeri et al. |
| 2018/0022938 A1 | 1/2018 | Ijeri et al. |
| 2018/0194949 A1 | 7/2018 | Ijeri et al. |

FOREIGN PATENT DOCUMENTS

| | | |
|---|---|---|
| EP | 0263428 | 4/1988 |
| EP | 2011899 | 1/2009 |
| EP | 2743377 | 6/2014 |
| EP | 3272816 | 1/2018 |
| IE | 20080941 | 9/2009 |
| JP | 2986962 | 12/1999 |
| JP | 2004099943 | 4/2004 |
| WO | WO 2004/024835 | 3/2004 |
| WO | WO 2014/188390 | 11/2014 |

OTHER PUBLICATIONS

Alibakhshi et al., "Fabrication and Characterization of $PO_4^{3-}$- Intercalated Zn-Al-Layered Double Hydroxide Nanocontainer", Jan. 1, 2016, pp. C495-0505, vol. 163, No. 8, Journal of the Electrochemical Society, Pennington, New Jersey.

"Authorisation List," European Chemicals Agency (ECHA), retrieved at http://echa.europa.eu/addressing-chemicals-of-concern/authorisation/recommendation-for-inclusion-in-the-authorisation-list/authorisation-list, Jun. 23, 2012, 3 pages.

"Hexavalent Chromium," OSHA, retrieved at https://vvww.osha.gov/SLTC/hexavalentchromium/, Jan. 2, 2004, 2 pages.

Poznyak et al., "Novel Inorganic Host Layered Double Hydroxides Intercalated with Guest Organic Inhibitors for Anticorrosion Applications," Applied Materials & Interfaces, Oct. 12, 2009, pp. 2353-2362, vol. 1—No. 10, American Chemical Society, Washington, DC, USA.

Shkirskiy et al., "Factors Affecting $MoO_4^{2-}$ Inhibitor Release from $Zn_2Al$ Based Layered Double Hydroxide and Their Implication in Protecting Hot Dip Galvanized Steel by Means of Organic Coatings", Nov. 3, 2015, pp. 25180-25192, vol. 7, No. 45, ACS Applied Materials & Interfaces, Washington, D.C.

Wang et al., "A room temperature cured sol-gel anticorrosion pre-treatment for Al 2024-T3 alloys," Corrosion Science, Dec. 2007, pp. 4491-4503, vol. 49—No. 12, Elsevier Ltd., London, England.

Yasakau et al., "Active Corrosion Protection by Nanoparticles and Conversion Films of Layered Double Hydroxides," Proceedings of the Corrosion 2013 Research Topical Symposium: Functionalized Coatings for Durable Materials and Interfaces, May 2014, pp. 436-445, vol. 70—No. 5, NACE International, Houston, Texas, USA.

Yasakau et al., "Mechanism of Corrosion Inhibition of AA2024 by Rare-Earth Compounds," Journal of Physical Chemistry B, Feb. 17, 2006, pp. 5515-5528, vol. 110—No. 11, American Chemical Society, Washington, DC, USA.

Zheludkevich et al., "Active protection coatings with layered double hydroxide nanocontainers of corrosion inhibitor", Feb. 1, 2010, pp. 602-611, vol. 52, No. 2, Corrosion Science, Oxford, GB.

Zhong et al., "Self-repairing vanadium-zirconium composite conversion coating for aluminum alloys," Applied Surface Science, Sep. 1, 2013, pp. 489-493, vol. 280, Elsevier B.V., Amsterdam, Netherlands.

Adhikari et al., "Hexafluorozirconic acid based surface pretreatments: Characterization and performance assessment," Electrochimica Acta, Jan. 15, 2011, pp. 1912-1924, vol. 56—No. 4, Elsevier Ltd., London, England.

Alhendawi et al., "New soft porous frameworks based on lambda-zirconium phosphate and aliphatic dicarboxylates: Synthesis and structural characterization," Journal of Physical and Chemistry of Solids, Nov. 2015, pp. 95-100, vol. 86, Elsevier Ltd., London, England.

Cerezo et al., "The effect of surface pre-conditioning treatments on the local composition of Zr-based conversion coatings formed on aluminium alloys," Applied Surface Science, Mar. 15, 2016, pp. 339-347, vol. 366, Elsevier B.V., Amsterdam, Netherlands.

Shida et al., "Zirconium-phosphate films self-assembled on aluminum substrate toward corrosion protection," Surface and Coatings Technology, Jun. 2, 2003, pp. 686-690, vol. 169-170, Elsevier Science B.V., Amsterdam, Netherlands.

Versace et al., "Influence of zirconium propoxide on the radical induced photopolymerisation of hybrid sol-gel material", First published as an Advance Article on the web Sep. 18, 2008, DOI: 10.1039/b806056h, vol. 32, pp. 2270-2278, New Journal of Chemistry.

Yang et al., "Structure and synergetic antibacterial effect of zinc and cerium carried sodium zirconium phosphates," Journal of Rare Earths, Apr. 1, 2011, pp. 308-312, vol. 29—No. 4, Elsevier, Amsterdam, Netherlands.

SOL-GEL COATING COMPOSITIONS INCLUDING CORROSION INHIBITOR-ENCAPSULATED LAYERED DOUBLE HYDROXIDE AND RELATED PROCESSES

CROSS-REFERENCE TO RELATED APPLICATIONS

This application is a continuation of U.S. patent application Ser. No. 15/231,654 filed Aug. 8, 2016 and entitled "SOL-GEL COATING COMPOSITIONS INCLUDING CORROSION INHIBITOR-ENCAPSULATED LAYERED DOUBLE HYDROXIDE AND RELATED PROCESSES" (now U.S. Pat. No. 10,246,593), which claims the benefit of and priority to U.S. Provisional Patent Application No. 62/364,657 filed Jul. 20, 2016 and entitled "SOL-GEL COATING COMPOSITIONS INCLUDING CORROSION INHIBITOR-ENCAPSULATED LAYERED DOUBLE HYDROXIDE AND RELATED PROCESSES", the contents both of which are hereby incorporated by reference in their entirety.

BACKGROUND

1. Technical Field

The present disclosure relates to coating compositions and processes and, more particularly, to sol-gel coating compositions including corrosion inhibitor-encapsulated layered double hydroxide and related processes.

2. Related Art

High strength alloys such as aluminum alloys are widely used in various industries such as the aerospace industry due to their high strength to weight ratio. However these alloys are prone to corrosion due to the presence of alloying materials.

In order to protect these alloys from the environment, a chrome conversion coating may be provided on a surface of an alloy followed by application of primer and a top coat. Although organic paint systems applied on the surface provide good barrier properties against corrosion, even small defects formed in the organic paint ensure pathways for the ingress of electrolyte to the metallic surface, which initiates localized corrosion. Therefore, chromium based conversion coatings have been used in anti-corrosion pre-treatments before application of organic coatings. However, hexavalent chromium compounds have harmful effects.

Thus, there is a need for coating compositions and processes that are chromium-free while providing a coating that is corrosion-resistant.

SUMMARY

In accordance with embodiments of the present disclosure, various methods and formulations are provided relating to sol-gel coating of substrates such as an aluminum substrate, an aluminum alloy substrate (e.g., AA 2024, AA6061, or AA7075), or other substrate. The sol-gel coating provided on a substrate advantageously provides corrosion protection. Further, the sol-gel coating provided on the substrate advantageously provides enhanced adhesion between the substrate and a paint system (e.g., primer and paint).

In one exemplary aspect, a method for preparing a corrosion inhibiting material (CIM) includes adding a Zn—Al layered double hydroxide (LDH) composition to a solution including a corrosion inhibiting compound and stirring, collecting a precipitate of the solution, and washing and drying the precipitate of the solution to form the corrosion inhibiting material in which the corrosion inhibiting compound is intercalated in the Zn—Al LDH composition. The method may further include mixing a zinc nitrate solution and an aluminum nitrate solution and stirring under nitrogen purging to form a mixture, adding a sodium nitrate solution to the mixture while maintaining a pH ranging from about 8 to about 12 and stirring under nitrogen purging, collecting a precipitate of the mixture, and washing and drying the precipitate of the mixture to form the Zn—Al LDH composition. An organic corrosion inhibiting material may be formed by using an organic corrosion inhibiting compound (e.g., an imidazole such as 1-(3-aminopropyl)imidazole; a triazole such as 1H-1,2,3-triazole, 4-methyl-4H-1,2,4-triazole-3-thiol, 1,2,4-triazole-3-carboxylic acid, 3-amino-1,2,4-triazole-5-thiol, 4H-1,2,4-triazol-4-amine, 3-mercapto-4-methyl-4H-1,2,4-triazole, or 5-phenyl-1H-1,2,4-triazole-3-thiol; a tetrazole such as 1-methyl-1H-tetrazole-5-thiol or 1H-tetrazole-5-acetic acid; a thiazole such as 4-methyl-1,3-thiazole-5-carboxylic acid; a thiadiazole such as 1,3,4-thiadiazole-2,5-dithiol; a benzimidazole such as 1H-benzimidazole-2-carboxylic acid; a benzotriazole such as 1H-benzotriazole; a benzothiazole such as 2-mercaptobenzothiazole; a quinoline such as 8-hydroxyquinoline; phytic acid; an organophosphonic acid such as amino tris(methylenephosphonic acid), ethylenediamine tetra(methylenephosphonic acid), 1-hydroxyethylidene-1,1-diphosphonic acid, or diethylenetriamine penta(methylenephosphonic acid); a vegetable oil such as linseed oil or other vegetable oil containing saturated and/or unsaturated fatty acids such as stearic acid, palmitic acid, oleic acid, linoleic acid, or linolenic acid; and/or other organic corrosion inhibiting compound). An inorganic corrosion inhibiting material may be formed by using an inorganic corrosion inhibiting compound (e.g., a vanadate, a molybdate, a tungstate, a phosphate, a manganate, a permanganate, an aluminate, and/or other inorganic corrosion inhibiting compound).

In an additional exemplary aspect, a method for preparing a CIM-containing sol-gel composition includes adding the corrosion inhibiting material to a sol-gel composition to form the CIM-containing sol-gel composition. The amount of the corrosion inhibiting material that is added may range from about 1 to about 10 parts by weight per 100 parts by weight of the sol-gel composition. The method may further include contacting a first alkoxysilane with water and an inorganic acid to form a first composition, contacting a zirconium alkoxide with an organic acid to form a second composition, contacting the first composition with the second composition to form a mixture, contacting one or more second alkoxysilanes and an organic acid with the mixture to form the sol-gel composition, the sol-gel composition having a ratio of a number of moles of silicon to a number of moles of zirconium ($n_{Si}/n_{Zr}$) ranging from about 2 to about 10, and adding a photoinitiator to the sol-gel composition. An organic CIM-containing sol-gel composition may be formed by using an organic corrosion inhibiting material. An inorganic CIM-containing sol-gel composition may be formed using an inorganic corrosion inhibiting material.

In another exemplary aspect, a method for providing a corrosion-resistant coating on a substrate includes forming the corrosion-resistant coating including multiple sol-gel layers on the substrate using the organic CIM-containing sol-gel composition and the inorganic CIM-containing sol-gel composition. The multiple sol-gel layers may be formed by applying the organic CIM-containing sol-gel composition on the substrate to form one or more organic CIM-containing sol-gel layers, curing the one or more organic CIM-containing sol-gel layers by UV radiation, applying the inorganic CIM-containing sol-gel composition on the substrate to form one or more inorganic CIM-containing sol-gel layers, curing the one or more second sol-gel layers by the UV radiation, and thermally curing multiple sol-gel layers including the one or more organic CIM-containing sol-gel layers and the one or more inorganic CIM-containing sol-gel layers. The method may further include applying primer and/or paint on the multiple sol-gel layers of the substrate, the multiple sol-gel layers facilitating adherence of the primer or the paint to the substrate.

In yet another exemplary aspect, a corrosion inhibiting material, a CIM-containing sol-gel composition, and/or a corrosion-resistant coating that includes multiple sol-gel layers may be provided by any of the above methods.

In a further exemplary aspect, a corrosion-resistant coated product includes a plurality of sol-gel layers on a substrate, the plurality of sol-gel layers including at least one organic CIM-containing sol-gel layer and at least one inorganic CIM-containing sol-gel layer. The organic CIM-containing sol-gel layer includes an organic corrosion inhibiting material and a polymer composite of one or more alkoxysilanes, a zirconium alkoxide, and an organic acid. The organic corrosion inhibiting material includes a Zn—Al layered double hydroxide (LDH) composition encapsulating an organic corrosion inhibiting compound. The inorganic CIM-containing sol-gel layer includes an inorganic corrosion inhibiting material and a polymer composite of one or more alkoxysilanes, zirconium alkoxide, and an organic acid. The inorganic corrosion inhibiting material includes a Zn—Al LDH composition encapsulating an inorganic corrosion inhibiting compound.

The scope of the invention is defined by the claims, which are incorporated into this section by reference. A better understanding of the methods and formulations for sol-gel coating of the present disclosure, as well as an appreciation of the above and additional advantages thereof, will be afforded to those of skill in the art by a consideration of the following detailed description of one or more example embodiments thereof. In this description, reference is made to the various views of the appended sheets of drawings, which are briefly described below, and within which, like reference numerals are used to identify like ones of the elements illustrated therein.

BRIEF DESCRIPTION OF THE DRAWINGS

FIG. 9B is an image of a sol-gel coated substrate formed by the process of FIG. 4 after a corrosion-resistance test.

DETAILED DESCRIPTION

Figure 1:
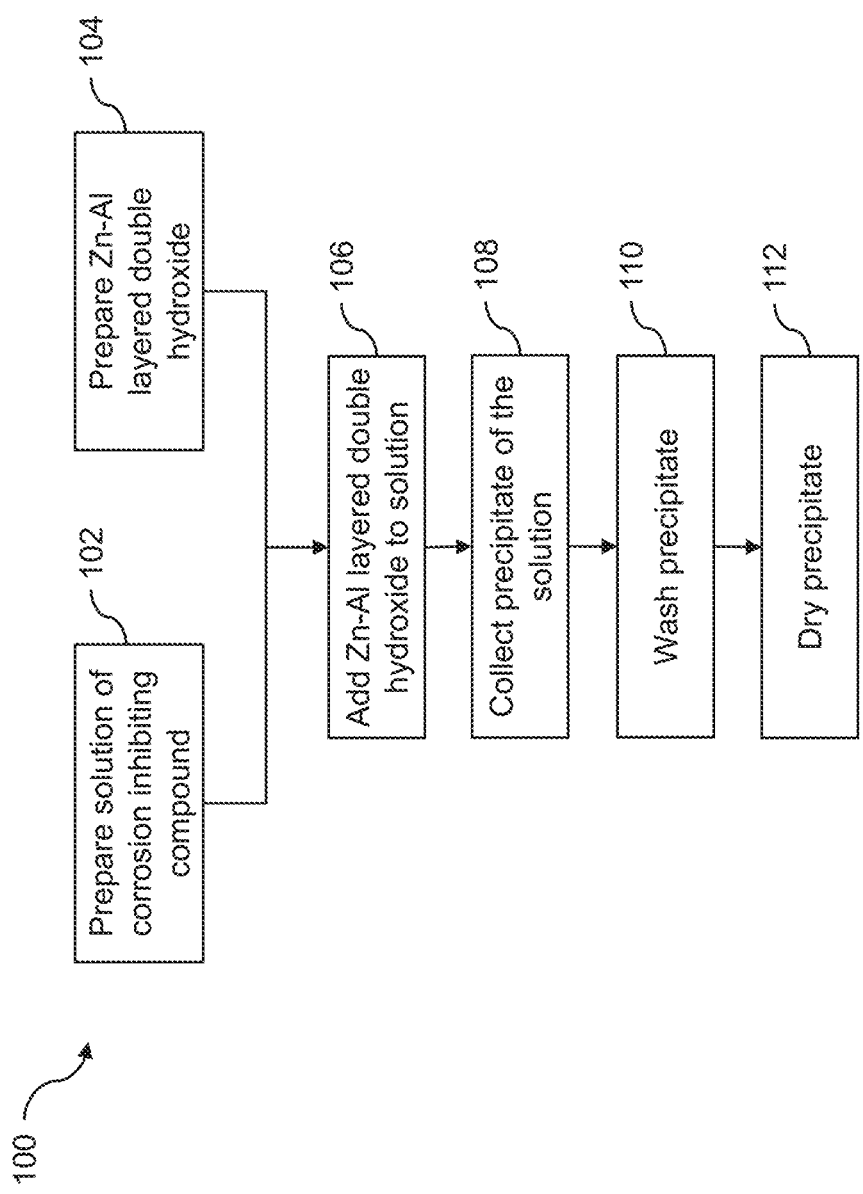
FIG. 1 illustrates an example process for preparing a corrosion inhibiting material in accordance with an embodiment of the present disclosure.

The following description is merely exemplary in nature and is not intended to limit the present disclosure, application, or uses.

The terms "substituent", "radical", "group", "moiety," and "fragment" may be used interchangeably.

Singular forms "a" and "an" may include plural reference unless the context clearly dictates otherwise.

The number of carbon atoms in a substituent can be indicated by the prefix "$C_{A-B}$" where A is the minimum and B is the maximum number of carbon atoms in the substituent. The term "alkyl" embraces a linear or branched acyclic alkyl radical containing from 1 to about 15 carbon atoms. In some embodiments, alkyl is a $C_{1-10}$ alkyl, $C_{1-6}$ alkyl, or $C_{1-3}$ alkyl radical. Examples of alkyl include, but are not limited to, methyl, ethyl, propyl, isopropyl, butyl, isobutyl, tent-butyl, sec-butyl, pentan-3-yl (i.e.,

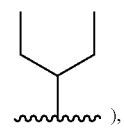

), and the like.

The term "alkoxy" is RO—where R is alkyl. Non-limiting examples of alkoxy include methoxy, ethoxy, propoxy, n-butyloxy, and tert-butyloxy. The terms "alkyloxy", "alkoxy," and "alkyl-O—" may be used interchangeably.

The term "methacryl" is

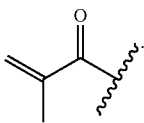 [SMILES: *C(=O)C(=C)C]

The term "methacryloxy" is

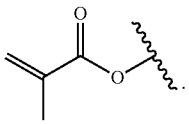 [SMILES: *OC(=O)C(=C)C]

The term "methacryloxyalkyl" embraces alkyl substituted with methacryloxy. Non-limiting examples of methacryloxyalkyl include methacryloxyethyl, methacryloxypropyl, and methacryloxybutyl.

The term "glycidyl" is

The term "glycidyloxy" is

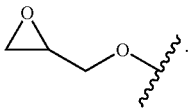

The terms "glycidyloxy" and "glycidoxy" may be used interchangeably.

The term "glycidoxyalkyl" embraces alkyl substituted with glycidoxy. Non-limiting examples of glycidoxyalkyl include, glycidoxyethyl, and glycidoxypropyl, and glycidoxybutyl. The terms "glycidyloxyalkyl" and "glycidoxyalkyl" may be used interchangeably.

The term "aminoalkyl" embraces an amino radical attached to a parent molecular scaffold through an alkyl radical (e.g., $NH_2$-alkyl-scaffold).

The term "aryl" refers to any monocyclic, bicyclic, or tricyclic cyclized carbon radical, wherein at least one ring is aromatic. An aromatic radical may be fused to a non-aromatic cycloalkyl or heterocyclyl radical. Aryl may be substituted or unsubstituted. Examples of aryl include phenyl and naphthyl.

The term "aralkyl" embraces aryl attached to a parent molecular scaffold through alkyl and may be used interchangeably with the term "arylalkyl." Examples of aralkyl include benzyl, diphenylmethyl, triphenylmethyl, phenylethyl, and diphenylethyl. The terms "benzyl" and "phenylmethyl" may be used interchangeably.

The term "silane" is a compound containing silicon.

The term "organosilane" is a silane having at least one silicon to carbon bond.

The term "alkoxysilane" is a silane having at least one silicon to alkoxy bond.

The term "organoalkoxysilane" is a silane having at least one silicon to carbon bond and at least one silicon to alkoxy bond.

The term "about," as used herein when referring to a measurable value such as an amount, concentration, time and the like, is meant to encompass variations of ±20%, ±10%, ±5%, ±1%, ±0.5%, or even ±0.1% of the specified value.

Compositions and processes relating to sol-gel coating of substrates such as metal or metal alloy substrates (e.g., aluminum substrates, aluminum alloy substrates (e.g., AA 2024, AA6061, or AA7075), or other substrates) are provided. Sol-gel coating may be used as a chrome-free pretreatment on substrates prior to the application of organic coatings such as primer and paint. The pretreatment may be performed by applying a layer of a sol-gel composition that includes a corrosion inhibiting material (CIM). The sol-gel composition is obtained as a product of hydrolysis and condensation of a mixture of organosilanes and a metal alkoxide, along with a corrosion inhibitor (also referred to as a corrosion inhibiting compound) encapsulated in nanocarriers (also referred to as nanocontainers or nanoparticles) made up of layered double hydroxide (LDH) such as Zn—Al LDH. Nanocarriers have a size ranging from about 1 nm to about 1000 nm. Ultraviolet (UV) radiation is used to densify the sol-gel layer in addition to, or instead of, thermal curing the sol-gel layer. Thermal curing may include exposing the sol-gel layer to a high temperature (e.g., in a hot air circulated oven). Alternatively, or in addition, thermal curing may include exposing the sol-gel layer to infrared (IR) radiation or near IR radiation, which reduces curing time. Advantageously, the sol-gel coating composition may be low temperature curable, provide excellent barrier protection, and possess self-healing properties to render prolonged corrosion protection. Further, the sol-gel layers formed using the sol-gel coating composition may release corrosion inhibiting compounds on demand.

FIG. 1 illustrates an example process 100 for preparing a corrosion inhibiting material. The corrosion inhibiting material includes a layered double hydroxide (LDH) composition (e.g., a Zn—Al LDH composition) encapsulating one or more corrosion inhibiting compounds. The corrosion inhibiting material may be an organic corrosion inhibiting material that includes one or more organic corrosion inhibiting compounds, an inorganic corrosion inhibiting material that includes one or more organic corrosion inhibiting compounds, or a combination corrosion inhibiting material that includes one or more organic corrosion inhibiting compounds and one or more inorganic corrosion inhibiting compounds.

At block 102, a solution of corrosion inhibiting compound is prepared. For example, an organic corrosion inhibiting compound is dissolved or dispersed in a solvent to form the solution. In another example, an inorganic corrosion inhibiting compound is dissolved in a solvent to form the solution. In a further example, an organic corrosion inhibiting compound and an inorganic corrosion inhibiting compound is dissolved in a solvent to form the solution.

In an aspect, the organic corrosion inhibiting compound is an imidazole, a triazole, a tetrazole, a thiazole, a thiadiazole, a benzimidazole, a benzotriazole, a benzothiazole, a quinoline, phytic acid, an organophosphonic acid, or an oil. The oil includes saturated and/or unsaturated fatty acids such as stearic acid, palmitic acid, oleic acid, linoleic acid, and/or linolenic acid. The oil may be a vegetable oil such as linseed oil or other vegetable oil.

Specific examples of the organic corrosion inhibiting compound include 1-(3-aminopropyl)imidazole, 1H-1,2,3-triazole, 4-methyl-4H-1,2,4-triazole-3-thiol, 1,2,4-triazole-3-carboxylic acid, 3-amino-1,2,4-triazole-5-thiol, 4H-1,2,4- triazol-4-amine, 3-mercapto-4-methyl-4H-1,2,4-triazole, 5-phenyl-1H-1,2,4-triazole-3-thiol, 1-methyl-1H-tetrazole-5-thiol, 1H-tetrazole-5-acetic acid, 4-methyl-1,3-thiazole-5-carboxylic acid, 1,3,4-thiadiazole-2,5-dithiol, 1H-benzimidazole-2-carboxylic acid, 1H-benzotriazole (BTA), 2-mercaptobenzothiazole (MBT), 8-hydroxyquinoline, phytic acid, amino tris(methylenephosphonic acid) (ATMP), ethylenediamine tetra(methylenephosphonic acid) (EDTMP), 1-hydroxyethylidene-1,1-diphosphonic acid (HEDP), diethylenetriamine penta(methylenephosphonic acid) (DTPMP), and linseed oil.

In an aspect, the inorganic corrosion inhibiting compound is a salt of an oxyanion of a transition metal, a post-transition metal, a metalloid, or a polyatomic non-metal.

In another aspect, the inorganic corrosion inhibiting compound is a vanadate, a molybdate, a tungstate, a phosphate, a manganate, a permanganate, or an aluminate.

Specific examples of the inorganic corrosion inhibiting compound include sodium metavanadate, potassium permanganate, sodium molybdate, and sodium tungstate.

At block 104, a Zn—Al LDH composition is prepared. For example, the Zn—Al LDH compound may be prepared by a process 200 of FIG. 2.

At block 106, the Zn—Al LDH composition is added to the solution of the corrosion inhibiting compound. For example, the Zn—Al LDH composition in an amount ranging from about 5 to about 100 g per 1 L of the solution is added to the solution with stirring and stirring is continued for a time period ranging from 3 to about 48 h. The amount of the Zn—Al LDH composition may be 5, 10, 15, 20, 25, 30, 35, 40, 45, 50, 55, 60, 65, 70, 75, 80, 85, 90, 95, or 100 g per 1 L of the solution, where any value may form an upper end point or a lower end point, as appropriate. The time period may be about 3, 6, 9, 12, 15, 18, 21, 24, 27, 30, 33, 36, 39, 42, 45, or 48 h, where any value may form an upper end point or a lower end point, as appropriate. A corrosion inhibitor encapsulated LDH precipitate is formed as a result of block 106. The Zn—Al LDH is intercalated with the corrosion inhibiting compound such that the Zn—Al LDH composition functions as nanocontainers that encapsulate the corrosion inhibiting compound.

At block 108, the precipitate of the solution of the corrosion inhibiting compound is collected, for example, by centrifugation. The precipitate is washed at block 110 and dried at block 112 to form the corrosion inhibiting material. For example, the precipitate is washed with hot water until the pH of the supernatant is neutral, and then dried in a drying oven. The corrosion inhibiting material includes a corrosion inhibiting compound-exchanged Zn—Al LDH composition (also referred to as a corrosion inhibiting compound-incorporated Zn—Al LDH composition, a corrosion inhibiting compound-intercalated Zn—Al LDH composition or a corrosion inhibiting compound-encapsulated Zn—Al LDH composition).

If an organic corrosion inhibiting compound was used in block 102, the corrosion inhibiting material is an organic corrosion inhibiting material that includes the organic corrosion inhibiting compound encapsulated in the Zn—Al LDH composition. If an inorganic corrosion inhibiting compound was used in block 102, the corrosion inhibiting material is an organic corrosion inhibiting material that includes the organic corrosion inhibiting compound encapsulated in the Zn—Al LDH composition. Accordingly, in embodiments in which both an inorganic corrosion inhibiting material and an organic corrosion inhibiting material are desired, process 100 may be performed twice, once using an organic corrosion inhibiting compound at block 102 and once using an inorganic corrosion inhibiting compound at block 102.

In some embodiments, a combination corrosion inhibiting material that includes the Zn—Al LDH composition encapsulating both an organic corrosion inhibiting compound and an inorganic corrosion inhibiting compound may be formed by mixing an organic corrosion inhibiting material and an inorganic corrosion inhibiting compound each prepared by respective process 100, or by preparing a solution including both types of corrosion inhibiting compounds at block 102 in one process 100.

EXAMPLE 1

For a vanadate-based corrosion inhibiting material, 400 ml of sodium metavanadate ($NaVO_3$) solution having a concentration of about 0.1 M was prepared. The pH of this solution was adjusted to a pH ranging from about 8 to about 9 by addition of a NaOH solution having a concentration of about 2.0 M. To this, 10 g of a Zn—Al LDH composition was added with continuous stirring. Stirring was continued for 24 h. The powder was centrifuged after 24 h, washed with hot water until the pH of the supernatant was neutral, and followed by drying the vanadate-exchanged Zn—Al LDH composition at 60° C. for a time period ranging from about 3 to about 4 h in a drying oven. Similarly, different corrosion inhibiting materials were prepared by using a number of different molecules such as 2-mercaptobenzothiazole, benzotriazole, 1,3,4-thiadiazole-2,5-dithiol, 1-methyl-1-tetrazole-5-thiol, 4-methyl-4H-1,2,4-triazole-3-thiol, 8-hydroxyquinoline, phytic acid, an organophosphonic acid, and linseed oil as examples. Other corrosion inhibiting materials may be prepared using other organic corrosion inhibiting compounds (e.g., imidazoles, triazoles, thiazoles, vegetable oils such as linseed oil) or inorganic corrosion inhibiting compounds in other examples.

Figure 2:
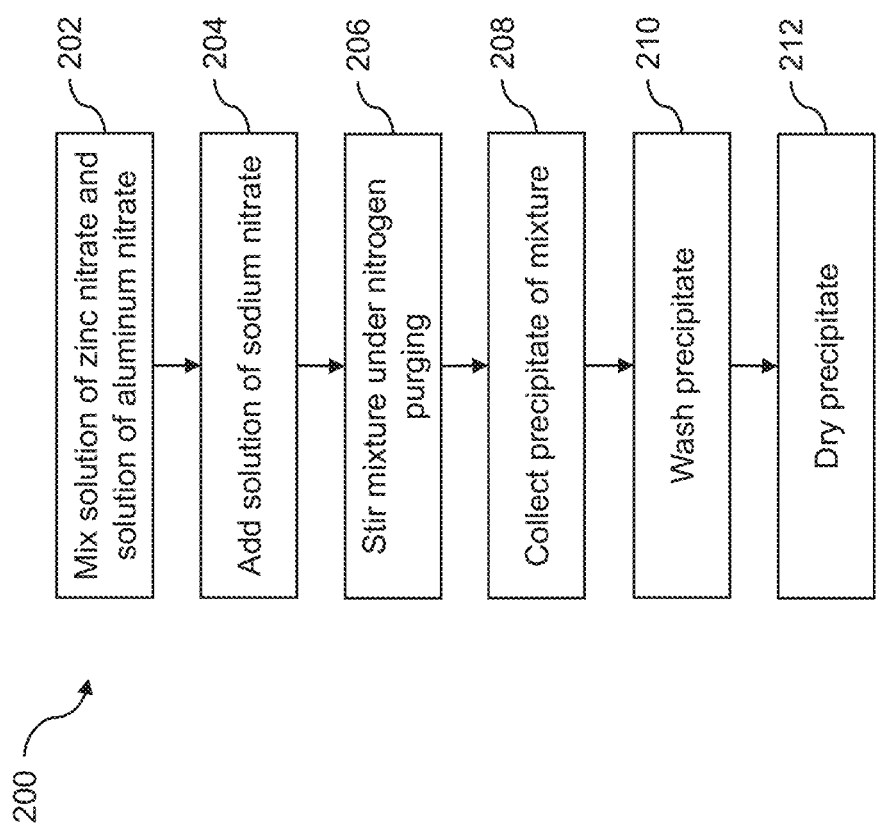
FIG. 2 illustrates an example process for preparing a Zn—Al layered double hydroxide (LDH) composition in accordance with an embodiment of the present disclosure.

FIG. 2 illustrates an example process 200 for preparing a Zn—Al LDH composition. For example, block 104 of FIG. 1 may be performed by process 200.

At block 202, a solution of a zinc salt (e.g., zinc nitrate or other zinc salt) and a solution of aluminum salt (e.g., aluminum nitrate or other aluminum salt) is mixed to form a solution of zinc and aluminum. For example, zinc nitrate is dissolved in a solvent, aluminum nitrate is dissolved in a solvent, and the zinc nitrate solution and the aluminum solution is mixed and stirred under nitrogen purging to form the solution of zinc and aluminum, also referred to as a mixture.

At block 204, a solution of an alkali metal salt such as a sodium salt (e.g., sodium nitrate or other sodium salt) is added to the mixture. For example, a solution of sodium nitrate is added drop-wise to the mixture while maintaining a pH ranging from about 8 to about 11 using a base solution (e.g., a 2.0 M sodium hydroxide solution or other base solution). The maintained pH may be about 8, 8.5, 9, 9.5, 10, 10.5, or 11, where any value may form an upper end point or a lower end point, as appropriate. A fluffy white precipitate is formed in the resulting mixture. Once the addition of the sodium nitrate solution is complete, at block 206, the mixture is stirred vigorously under nitrogen purging for a time period ranging from about 3 hours to 24 hours. The time period may be about 3, 6, 9, 12, 15, 18, 21, or 24 h, where any value may form an upper end point or a lower end point, as appropriate.

At block 208, the precipitate of the mixture is collected, for example, by centrifugation. The precipitate is washed at block 210 and dried at block 212 to form the Zn—Al LDH composition. For example, the precipitate is washed with hot water and then dried in a drying oven.

EXAMPLE 2

A solution of 104.1 g of $Zn(NO_3)_2 \cdot 6H_2O$ dissolved in 25 ml water and a solution of 65.6 g of $Al(NO_3)_3 \cdot H_2O$ dissolved in 25 ml water was mixed under vigorous stirring under $N_2$ purging. To this mixture, 87.5 ml of a $NaNO_3$ solution having a concentration of about 0.1 M, adjusted to pH 10, was added drop-wise and maintained at a pH of about 10 by adding a NaOH having a concentration of about 2.0 M. A fluffy LDH white precipitate was formed. Once the addition was complete, the entire mixture was stirred vigorously under $N_2$ purging for 12 h. The precipitate was centrifuged at 6500 rpm and washed about 3 or 4 times with hot water (at 80° C.), followed by drying at 65° C. for 24 h. A Zn—Al LDH composition in the form of a powder was formed.

Figure 3:
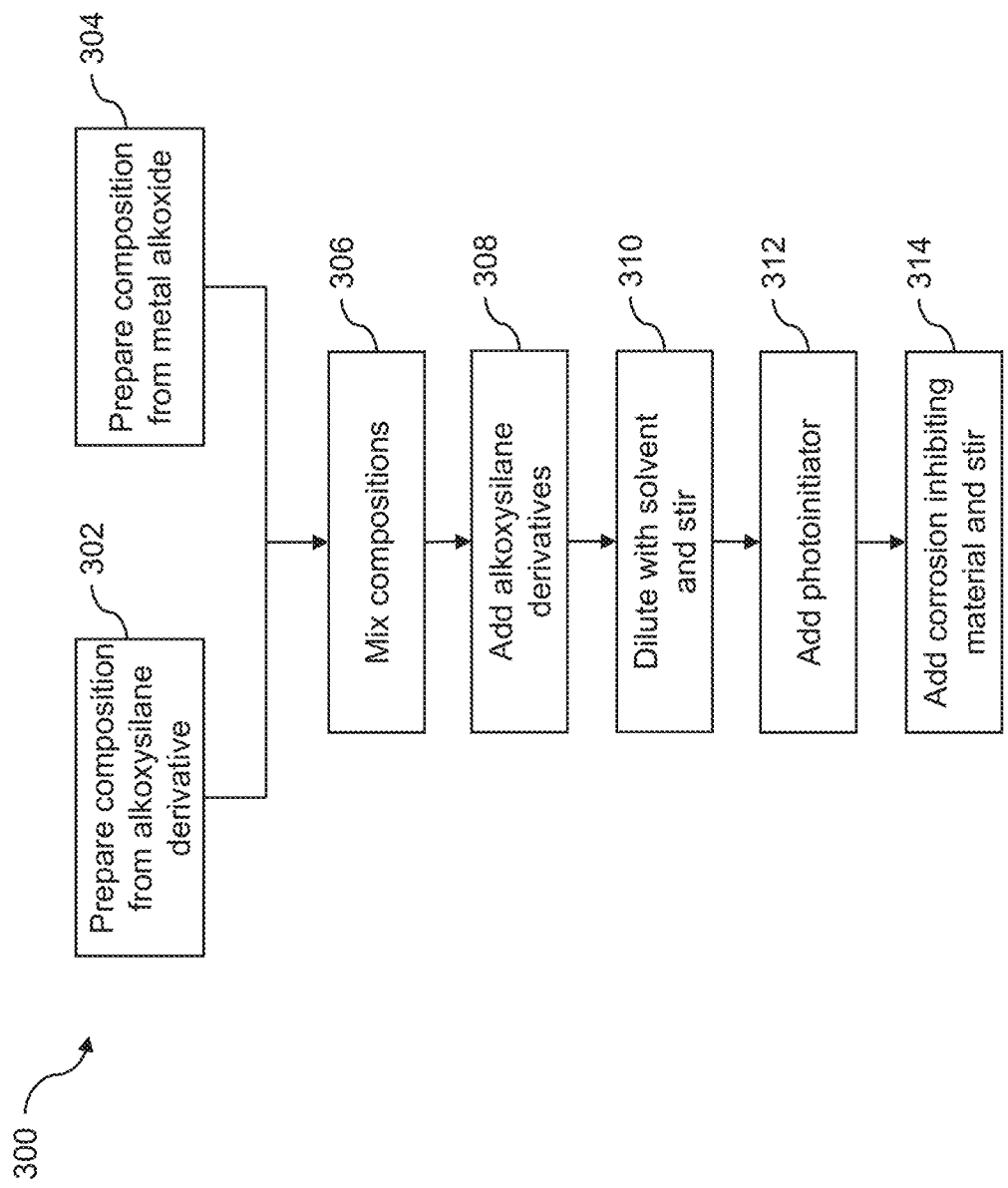
FIG. 3 illustrates an example process for preparing a sol-gel composition in accordance with an embodiment of the present disclosure.

FIG. 3 illustrates an example process 300 for preparing a sol-gel composition. A low temperature curable matrix sol is synthesized in two parts (composition A and composition B), the two parts are mixed together, additional compounds are added and stirred, and a corrosion inhibiting material is added to obtain a sol-gel composition.

At block 302, Composition A is prepared from an alkoxysilane such as an organoalkoxysilane. An alkoxysilane is contacted with water and an inorganic acid (e.g., HCl, $HNO_3$, $H_3PO_4$, or other inorganic acid) to form Composition A.

For example, an alkoxysilane is mixed with water and stirred, and an inorganic acid is added to the solution of the alkoxysilane and water and stirred in an ice bath until the solution turns transparent. The ratio of the number of moles of the alkoxysilane (which is equal to the number of moles of silicon from the alkoxysilane) to the number of moles of water ($n_{Si}/n_{water}$) in Composition A ranges from about 0.5 to about 2. The ratio may be, for example, about 0.5, 0.6, 0.7, 0.8, 0.9, 1.0, 1.1, 1.2, 1.3, 1.4, 1.5, 1.6, 1.7, 1.8, 1.9, or 2.0, where any value may form an upper end point or a lower end point, as appropriate.

In an aspect, an alkoxysilane of Formula I is used as Precursor A:

$$R_A\text{-Si-}(R_B)$$   Formula I wherein;
$R_A$ is methacryloxyalkyl or glycidoxyalkyl; and
$R_B$ is alkoxy.

In another aspect, $R_A$ is methacryloxyalkyl (e.g., methacryloxymethyl, methacryloxyethyl, methacryloxypropyl, methacryloxybutyl, or other methacryloxyalkyl) or glycidoxyalkyl (e.g., glycidoxymethyl, glycidoxyethyl, glycidoxypropyl, glycidoxybutyl); and each $R_B$ is independently alkoxy (e.g., methoxy, ethoxy, propoxy).

Specific examples of $R_A$—Si—$(R_B)_3$ include 3-methacryloxypropyltrimethoxysilane, 3-methacryloxypropyltriethoxysilane, 3-glycidyloxypropyltrimethoxysilane, and 3-glycidoxypropylethoxysilane.

In some aspects, an alkoxysilane used as Precursor A of a sol-gel composition includes methacryloxyalkyl alkoxysilane (an alkoxysilane of Formula I in which $R_A$ is methacryloxyalkyl) and/or a glycidoxyalkyl alkoxysilane (an alkoxysilane of Formula I in which the RA is glycidoxyalkyl). The methacryloxyalkyl alkoxysilane and/or the glycidoxyalkyl alkoxysilane are used, for example, to facilitate polymerization of the sol-gel composition when exposed to UV radiation.

At block 304, Composition B is prepared from a transition metal alkoxide such as a zirconium alkoxide. A zirconium alkoxide is contacted with an organic acid such as a carboxylic acid (e.g., methacrylic acid (MAA) or other carboxylic acid) to form Composition B.

For example, the zirconium alkoxide is mixed with methacrylic acid and stirred. The ratio of the number of moles of the zirconium alkoxide (which is equal to the number of moles of zirconium from the zirconium alkoxide) to the ratio of the number of moles of methacrylic acid (($n_{Zr}/n_{MAA}$) ranges from about 0.5 to about 2. The ratio may be, for example, about 0.5, 0.6, 0.7, 0.8, 0.9, 1.0, 1.1, 1.2, 1.3, 1.4, 1.5, 1.6, 1.7, 1.8, 1.9, or 2.0, where any value may form an upper end point or a lower end point, as appropriate.

In an aspect, a zirconium alkoxide of Formula II is used as Precursor B:

$$\text{Zr-}(R_C)_4$$   Formula II wherein;
$R_C$ is alkoxy.

In another aspect, each Rc is independently alkoxy (methoxy, ethoxy, n-propoxy, isopropoxy, n-butoxy, tert-butoxy, or other alkoxy).

Specific examples of Zr-$(Rc)_4$ include zirconium ethoxide, zirconium n-propoxide, zirconium isopropoxide, zirconium n-butoxide, and zirconium tert-butoxide.

In some aspects, a zirconium alkoxide is used as Precursor B of a sol-gel composition, for example, to match the coefficient of thermal expansion of the sol-gel composition with a substrate. The zirconium alkoxide may be used in an amount such that the coefficient of thermal expansion of the sol-gel composition is equal to or about the coefficient of thermal expansion of the substrate.

At block 306, Composition A and Composition B are mixed together. For example, Composition B is added to Composition A under stirring to avoid agglomeration, and the mixture of Composition A and Composition B is stirred in an ice bath and then stirred at room temperature so that the temperature of the mixture reaches room temperature.

At block 308, one or more alkoxysilanes such as one or more organoalkoxysilanes are added to the mixture of Composition A and Composition B. One or more alkoxysilanes and an organic acid such as a carboxylic acid (e.g., methacrylic acid or other carboxylic acid) are contacted with the mixture of Composition A and Composition B to form a sol-gel composition.

For example, each of one or more alkoxysilanes are added to the mixture and stirred. Then, methacrylic acid is added to the resulting mixture and stirred. Optionally, an inorganic acid is added before, together with, or after the organic acid.

In an aspect, one or more alkoxysilane of Formula III is used as Precursor C:

$$R_D\text{-Si-}(R_E)_3$$   Formula III wherein;
$R_D$ is aryl, aralkyl, glycidoxyalkyl, or aminoalkyl; and
$R_E$ is alkoxy.

In another aspect, $R_D$ is aryl (e.g., phenyl or other aryl), aralkyl (e.g., benzyl, phenylethyl, phenylpropyl, or other aralkyl), glycidoxyalkyl (e.g., glycidomethyl, glycidoxyethyl, glycidoxypropyl, glycidoxybutyl, or other glycidoxyalkyl), or aminoalkyl (e.g., aminomethyl, aminoethyl, aminopropyl, aminobutyl, or other aminoalkyl); and each $R_E$ is independently alkoxy (e.g., methoxy, ethoxy, propoxy).

Specific examples of $R_D$-Si-$(R_E)_3$ include phenyltrimethoxysilane, phenyltriethoxysilane, 3-glycidoxypropyltrimethoxysilane, 3-glycidoxypropyltriethoxysilane, 3-aminopropyltrimethoxysilane, and 3-aminopropyltriethoxysilane.

In some aspects, one or more alkoxysilanes used as Precursor C of a sol-gel composition include an aryl alkoxysilane (an alkoxysilane of Formula III in which $R_D$ is aryl), a glycidyloxyalkyl alkoxysilane (an alkoxysilane of Formula III in which $R_D$ is glycidoxyalkyl), and/or an aminoalkyl alkoxysilane (an alkoxysilane of Formula III in which $R_D$ is aminoalkyl). The aryl alkoxysilane is used, for example, to improve the barrier properties of a coating formed from the sol-gel composition. The glycidyloxyalkyl alkoxysilane is used, for example, to generate a thick coating. The aminoalkyl alkoxysilane is used, for example, to improve the adhesion of the sol-gel composition to a substrate when deposited.

In an example, an aryl alkoxysilane is added to the mixture and stirred. Then, an aminoalkyl alkoxysilane is added to the mixture and stirred. Then, a glycidyloxyalkyl alkoxysilane is added to the mixture. Then, methacrylic acid is added and stirred. An inorganic acid may also be added. The order of the alkoxysilanes that are added may be changed in other examples.

The total amount of the alkoxysilanes, which includes the alkoxysilane used in block 302 and the one or more alkoxysilanes used in block 308, and the amount of the zirconium alkoxide used in block 304 are such that the sol-gel composition has a ratio of a number of moles of alkoxysilanes (which is equal to the number of moles of silicon from the alkoxysilanes) to a number of moles of zirconium alkoxide (which is equal to the number of moles of zirconium from the zirconium alkoxide) ($n_{Si}/n_{Zr}$) ranging from about 2 to about 10. The ratio of the number of moles of silicon to the number of moles of zirconium ($n_{Si}/n_{Zr}$) may be about 2, 3, 4, 5, 6, 7, 8, 9, or 10, where any value may form an upper end point or a lower end point, as appropriate.

In some examples, one or more of the stirring performed in blocks 302, 304, 306, and/or 308 may be performed for a time period ranging from about 10 min to about 120 min. The stirring performed in blocks 302, 304, 306, and/or 308, may be performed for a time period of about 10, 20, 30, 40, 50, 60, 70, 80, 90, 100, 110, or 120 min, where any value may form an upper end point or a lower end point, as appropriate.

At block 310, the sol-gel composition is diluted with a solvent such as alcohol (e.g., isopropanol or other solvent) and stirred. The dilution of the sol-gel composition, the stirring to age the sol-gel composition, or both (e.g., block 310 entirely) may be omitted in some embodiments.

For example, the sol-gel composition is diluted with isopropanol in a weight ratio of about 1:1. The diluted sol-gel composition, or the sol-gel composition formed by block 308 if dilution is omitted, is stirred to age the sol-gel composition for a time period ranging from 1 to about 24 hours (h). The stirring to age the sol-gel composition may be performed for a time period of about 1, 2, 3, 4, 5, 6, 9, 12, 15, 18, 21, or 24 h, where any value may form an upper end point or a lower end point, as appropriate.

At block 312, a photoinitiator is added to the sol-gel composition formed by block 310 (or by block 308 for embodiments in which block 310 is omitted) and stirred.

For example, a photoinitiator in an amount ranging from about 0.5 to about 3 parts by weight per 100 parts by weight of the sol-gel composition (the weight of the sol-gel with the photoinitiator to be added or, alternatively, the weight of the sol-gel before adding the photoinitiator) is added, and the sol-gel composition with the photoinitiator is stirred. The amount of the photoinitiator may be about 0.5, 1, 1.5, 2, 2.5, or 3 parts by weight per 100 parts of the sol-gel composition, where any value may form an upper end point or a lower end point, as appropriate. The stirring may be performed for a time period ranging from about 10 to about 60 min. The stirring may be performed for a time period of about 10, 20, 30, 40, 50, or 60 min, where any value may form an upper end point or a lower end point, as appropriate. Once the photoinitiator is added, exposure of the sol-gel composition to light may be avoided by covering a container for the sol-gel composition (e.g., using aluminum foil) and/or storing in an amber-colored container.

At block 314, a corrosion inhibiting material is added to the sol-gel composition to form a CIM-containing sol-gel composition.

For example, a corrosion inhibiting material prepared by process 100 of FIG. 1 in an amount ranging from about 0.5 to about 10 parts by weight per 100 parts by weight of the sol-gel composition (the weight of the sol-gel with the corrosion inhibiting material to be added or, alternatively, the weight of the sol-gel before adding the corrosion inhibiting material) is added to the sol-gel composition and stirred to form a CIM-containing sol-gel composition. The amount of the corrosion inhibiting material may be about 0.5, 1, 1.5, 2, 2.5, 3, 4, 5, 6, 7, 8, 9, or 10 parts by weight per 100 parts by weight of the sol-gel composition, where any value may form an upper end point or a lower end point, as appropriate.

In another example, a corrosion inhibiting material in an amount of the sol-gel composition in an amount ranging from about 1 to about 10 parts by weight per 100 parts by weight of the solid content of the sol-gel composition is added to the sol-gel composition and stirred to form a CIM-containing sol-gel composition. The amount of the corrosion inhibiting material may be about 1, 2, 3, 4, 5, 6, 7, 8, 9, or 10 parts by weight per 100 parts by weight of the solid content of the sol-gel composition, where any value may form an upper end point or a lower end point, as appropriate. The sol-gel composition may have a solid content ranging from about 10 to about 70 parts by weight per 100 parts by weight of the sol-gel composition. The sol-gel composition may have a solid content of about 10, 20, 30, 40, 50, 60, or 70 parts by weight per 100 parts by weight of the sol-gel composition, where any value may form an upper end point or a lower end point, as appropriate.

If an organic corrosion inhibiting material is added, an organic CIM-containing sol-gel composition is formed. If an inorganic corrosion inhibiting material is added, an inorganic CIM-containing sol-gel composition is formed. Accordingly, in embodiments in which both an inorganic CIM-containing sol-gel composition and an organic corrosion inhibiting material are desired, process 300 may be performed twice, once using an organic CIM at block 314 and once using an inorganic CIM at block 314. Alternatively, the sol-gel composition may be divided into two or more batches and block 314 may be performed for each desired CIM-containing sol-gel compositions using a respective CIM.

Blocks 302-314 of process 300 may be performed in the order presented or in a different order and/or one or more blocks may be omitted in some embodiments. For example, blocks 310, 312, and 314 may be performed in a different order.

EXAMPLE 3

Composition A was synthesized by mixing 171.5 g of 3-methacryloxypropyltrimethoxysilane and 17.0 g of water in a glass jar loaded on a magnetic stirrer. 5.5 grams of 0.1 N HCl was further added to the mixture. The solution was stirred in an ice bath till the solution turned transparent. Although 3-methacryloxypropyltrimethoxysilane was used in this example, one or more other alkoxysilanes of Formula I may be used in place of, or in addition to, 3-methacryloxypropyltrimethoxysilane in other examples. Also, although HCl was used in this example, one or more other inorganic acids may be used in place of, or in addition to, HCl in other examples.

Composition B was synthesized by mixing 11.8 g of methacrylic acid and 45.2 g of zirconium n-propoxide under vigorous stirring. Stirring was continued for about 2 h. Although zirconium n-propoxide was used in this example, one or more other zirconium alkoxides of Formula II may be used in place of, or in addition to, zirconium n-propoxide in other examples.

Composition B was added to composition A under vigorous stirring to avoid agglomeration by placing the mixture in an ice bath, and the mixture was stirred for about 1 h. The jar containing the mixture was removed from the ice bath and stirred at room temperature for at least 1 hour for the mixture to come to room temperature.

Then 100 g of phenyltrimethoxysilane was added to the mixture of Composition A and Composition B and stirred for about 1 h, and then 100 g of 3-aminopropyltrimethoxysilane was added and stirred for about 1 hour. After completion of the 1 h of stirring with 3-aminopropyltrimethoxysilane, 25 grams of 3-glycidoxypropyltrimethoxysilane was added. Finally, 10 grams of methacrylic acid was added followed by 4 g of 0.1 N HCl and stirred for a further duration of 1 h. Although phenyltrimethoxysilane, 3-aminopropyltrimethoxysilane, and 3-glycidoxypropyltrimethoxysilane were used in this example, one or more other methoxysilanes of Formula III may be used in place of, or in addition to, phenyltrimethoxysilane, 3-aminopropyltrimethoxysilane, and/or 3-glycidoxypropyltrimethoxysilane in other examples.

The resulting mixture was diluted with isopropanol in a weight ratio of about 1:1 and stirred for about 3 hours at room temperature for aging. Although the mixture was stirred for about 3 hours, the mixture may be aged for a different time period in other examples, such as stirring overnight. Approximately 1 kg of sol-gel composition ready for coating application was formed. A photoinitiator, IRGACURE® 184, in the amount of about 2% by weight per 100% of the sol-gel composition (including the photoinitiator) was added and stirred for 30 min. Although IRGACURE® 184 was used in this example, one or more other photoinitiators may be used in place of, or in addition to, IRGACURE® 184 in other examples. After adding IRGACURE® 184, the sol-gel composition was kept away from light to avoid the sol-gel composition from interacting with light.

A corrosion inhibiting material that includes a vanadate-encapsulated Zn—Al LDH composition was added to one batch of the sol-gel composition to form an inorganic CIM-containing sol-gel composition. Although vanadate was used in this example, other inorganic corrosion inhibiting compounds may be used in other examples. A corrosion inhibiting material that includes a mercaptobenzothiazole-encapsulated Zn—Al LDH composition was added to another batch of the sol-gel composition to form an organic CIM-containing sol-gel composition. Although 2-mercaptobenzothiazole was used in this example, other inorganic corrosion inhibiting compounds may be used in other examples. The solid content of the sol-gel composition was about 28 parts by weight per 100 parts by weight of the sol-gel composition (including the photoinitiator). To add 5 parts by weight of the corrosion inhibiting material per 100 parts by weight of the solid content of the sol-gel composition, 1.4 g of the respective corrosion inhibiting compound was added per 100 g of each batch of the sol-gel composition and stirred overnight. Although the stirring was carried out overnight in this example, other time periods may be used in other examples (e.g., 2 hours may be sufficient for uniform dispersion).

Figure 4:
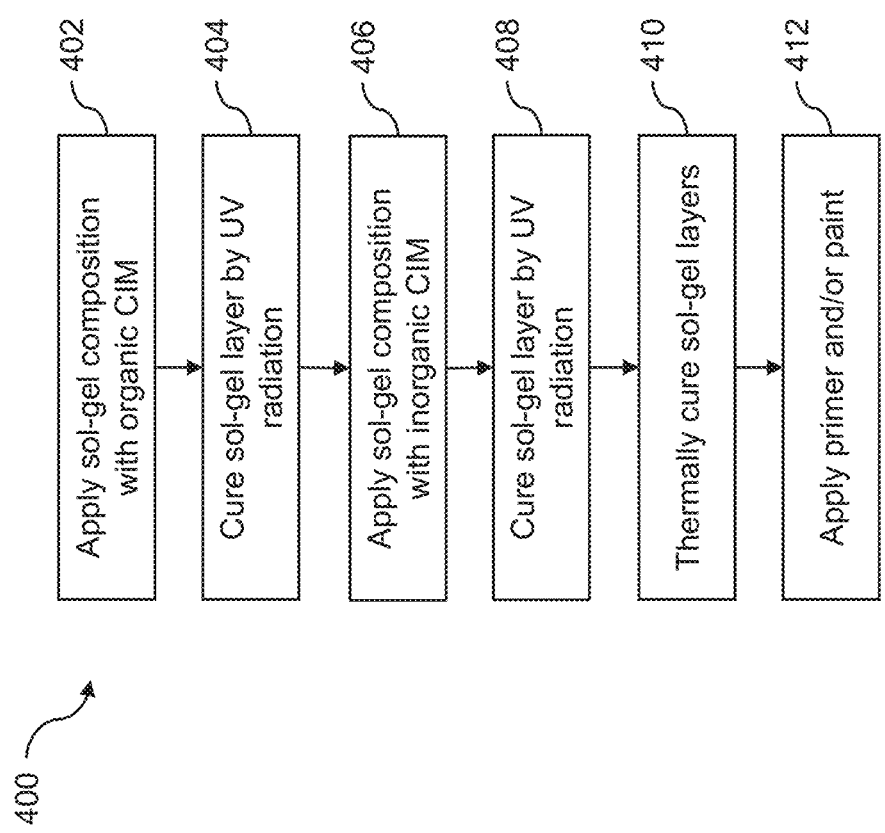
FIG. 4 illustrates an example process for forming a corrosion-resistant coating that includes one or more sol-gel layers on a substrate in accordance with an embodiment of the present disclosure.

FIG. 4 illustrates an example process 400 for forming a corrosion-resistant coating that includes one or more sol-gel layers (e.g., one or more sol-gel coatings) on a substrate such as a panel (e.g., an aluminum substrate, an aluminum alloy substrate, or other substrate). One or more layers of the sol-gel composition are applied to a substrate, each of the one or more layers is cured by UV light, and then the one or more layers of the sol-gel composition are thermally cured.

At block 402, an organic CIM sol-gel composition prepared by process 300 of FIG. 3 is applied to a substrate. For example, the organic CIM sol-gel composition is contacted with the substrate to form an organic CIM-containing sol-gel layer such as by dipping the substrate in the organic CIM sol-gel composition, by immersing the substrate in the organic CIM sol-gel composition, by spraying the organic CIM sol-gel composition on the substrate, and/or by other methods of applying the organic CIM sol-gel composition to the substrate. If dip coating is used, the organic CIM-containing sol-gel layers can be deposited using a withdrawals speed ranging from about 1 to about 15 mm/s (e.g., about 5 to about 12 mm/s, about 10 mm/s, or other withdrawal speed). The withdrawal speed may be about 1, 2, 3, 4, 5, 6, 7, 8, 9, 10, 11, 12, 13, 14, or 15 mm/s, where any value may form an upper end point or a lower end point, as appropriate.

At block 404, the organic CIM-containing sol-gel layer formed by block 402 is cured by UV radiation. For example, the UV radiation has a light dose ranging from about 500 to about 1000 $mJ/cm^2$. The UV radiation may have a light dose of about 500, 550, 600, 650, 700, 750, 800, 850, 900, 950, or 1000 $mJ/cm^2$, where any value may form an upper end point or a lower end point, as appropriate. The curing by UV radiation may be performed for a time period ranging from about 0.5 to about 30 min. The time period may be about 0.5, 1, 2, 3, 4, 5, 10, 15, 20, 25, or 30 min, where any value may form an upper end point or a lower end point, as appropriate.

At block 406, an inorganic CIM sol-gel composition prepared by process 300 of FIG. 3 is applied to a substrate. For example, the inorganic CIM sol-gel composition is contacted with the substrate to form an inorganic CIM-containing sol-gel layer such as by dipping the substrate in the inorganic CIM sol-gel composition, by immersing the substrate in the inorganic CIM sol-gel composition, by spraying the inorganic CIM sol-gel composition on the substrate, and/or by other methods of applying the inorganic CIM sol-gel composition to the substrate. If dip coating is used, the inorganic CIM-containing sol-gel layers can be deposited using a withdrawals speed ranging from about 1 to about 15 mm/s (e.g., about 5 to about 12 mm/s, about 10 mm/s, or other withdrawal speed). The withdrawal speed may be about 1, 2, 3, 4, 5, 6, 7, 8, 9, 10, 11, 12, 13, 14, or 15 mm/s, where any value may form an upper end point or a lower end point, as appropriate.

At block 408, the inorganic CIM-containing sol-gel layer formed by block 402 is cured by UV radiation. For example, the UV radiation has a light dose ranging from about 500 to about 1000 $mJ/cm^2$. The UV radiation may have a light dose of about 500, 550, 600, 650, 700, 750, 800, 850, 900, 950, or 1000 mJ/cm$^2$, where any value may form an upper end point or a lower end point, as appropriate. The curing by UV radiation may be performed for a time period ranging from about 0.5 to about 30 min. The time period may be about 0.5, 1, 2, 3, 4, 5, 10, 15, 20, 25, or 30 min, where any value may form an upper end point or a lower end point, as appropriate.

Blocks 402-404 are performed before blocks 406-408, but the order may be reversed in other embodiments. In some embodiments, blocks 402-404 are repeated to form one or more additional organic CIM-containing sol-gel layers and/or blocks 406-408 are repeated to form one or more additional inorganic CIM-containing sol-gel layers. Blocks 402-404 and/or blocks 406-408 may be repeated until the desired number of respective sol-gel layers is formed, in an order corresponding to the desired order of the respective CIM-containing sol-gel layers. In some embodiments, blocks 404 and/or 408 may be omitted for at least one of the sol-gel layers (e.g., at least one of the sol-gel layers may be air dried or thermally cured instead of curing using UV radiation). For example, curing using UV radiation may be omitted for the final, top-most sol-gel layer among the desired sol-gel layers.

At block 410, the sol-gel layers are thermally cured. For example, the multiple sol-gel layers including an organic CIM-containing sol-gel layer and an inorganic CIM-containing sol-gel layer are thermally cured at a temperature ranging from about 70 to about 90° C. The multiple sol-gel layers may be thermally cured at about 70, 75, 80, 85, or 90° C., where any value may form an upper end point or a lower end point, as appropriate. The thermal curing may be performed for a time period ranging from about 40 to about 120 minutes. The time period may be 40, 50, 60, 70, 80, 90, 100, 110, or 120 min, where any value may form an upper end point or a lower end point, as appropriate. In an example, the thermal curing is performed in a hot air circulated oven. Alternatively, or in addition to, thermal curing at a high temperature, the thermal curing includes exposing the sol-gel layers to infrared (IR) radiation, near IR radiation, and/or microwave radiation. For example, the sol-gel layers are exposed to IR and/or near IR radiation for a time period ranging from about 10 to about 60 min (e.g., 30 min or other time period). The time period of exposure to IR and/or near IR may be about 10, 15, 20, 25, 30, 35, 40, 45, 50, 55, or 60 min, where any value may form an upper end point or a lower end point, as appropriate.

At block 412, primer and/or paint is applied on the sol-gel layers of the substrate. For example, the primer is applied on the top-most sol-gel layer, and the paint is applied on the primer. Advantageously, the cured sol-gel layers not only provide corrosion resistance to the substrate but also facilitate adherence of the primer and/or paint to the substrate.

EXAMPLE 4

Each sol-gel layer of a substrate was UV cured using a conveyorized UV curing unit. UV curing was performed on both sides of the substrate using three-medium-pressure-mercury lamp conveyorized UV curing unit. The lamps provided an output of about 120 W/cm with a total wattage/lamp (1 m long)=12 kW. The belt speed was maintained at about 2 m/min during curing. The light dose as measured by a UV radiometer was 871 mJ/cm$^2$ in the UV-C region. After UV curing for about 5 minutes, the sol-gel layer coated substrate was subjected to thermal curing in an air circulated oven at 80° C. for an hour.

Figure 5:
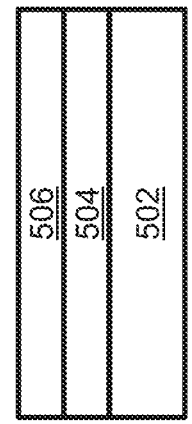
FIG. 5 illustrates an example corrosion-resistant coating that includes an inorganic CIM-containing sol-gel layer and an inorganic CIM-containing sol-gel layer formed by the process of FIG. 4 in accordance with embodiments of the present disclosure.

FIG. 5 illustrates an example corrosion-resistant coating that includes an inorganic CIM-containing sol-gel layer and an inorganic CIM-containing sol-gel layer formed by process 400 of FIG. 4. An organic CIM-containing sol-gel composition is contacted with substrate 502 to provide organic CIM-containing sol-gel layer 504, and sol-gel layer 504 is UV cured. Then, an inorganic CIM-containing sol-gel composition is contacted with sol-gel layer 504 to provide an inorganic CIM-containing sol-gel layer 506 on sol-gel layer 504, and sol-gel layer 506 is UV cured. Sol-gel layer 506 is not UV cured in other examples. Then, sol-gel layers 504 and 506 are thermally cured. The order of sol-gel layers 504 and 506 may be reversed in other examples. Further, although sol-gel layers including one organic CIM-containing sol-gel layer and one inorganic CIM-containing sol-gel layer is shown in FIG. 5, the corrosion-resistant coating may include more than one of each type of sol-gel layer in other examples.

Figure 6A:
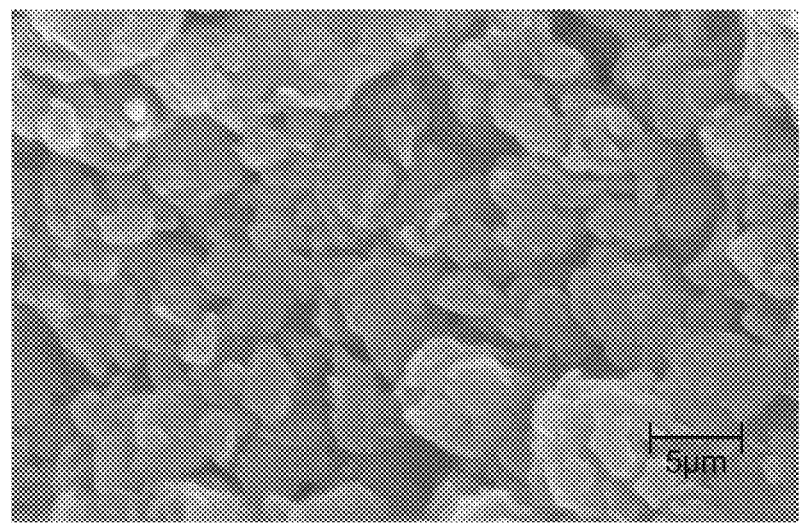
FIG. 6A is an SEM image of a Zn—Al layered double hydroxide (LDH) powder as prepared by the process of FIG. 2.
Figure 6B:
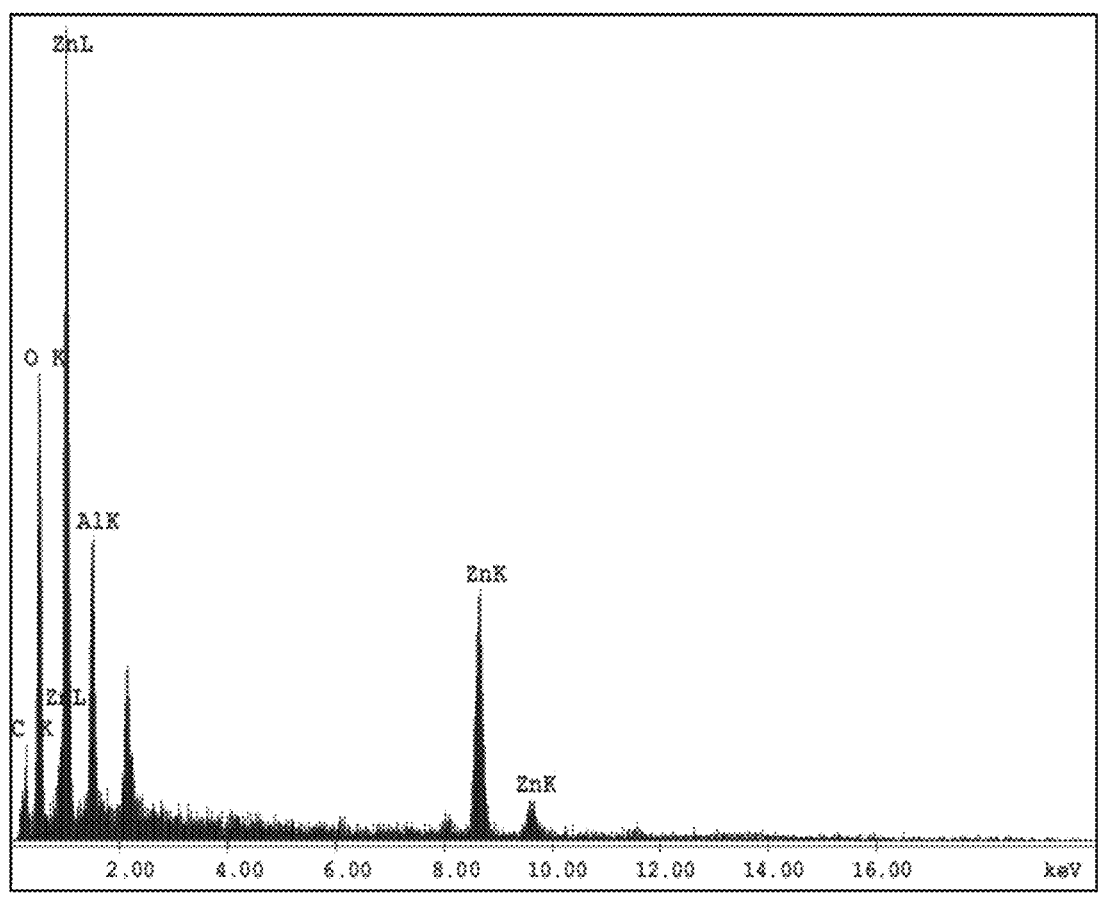
FIG. 6B is an energy-dispersive X-ray spectrum of the Zn—Al LDH composition of FIG. 6A.
Figure 7A:
FIG. 7A is an SEM image of a mercaptobenzothiazole-exchanged Zn—Al LDH composition as prepared by the process of FIG. 3.
Figure 7B:
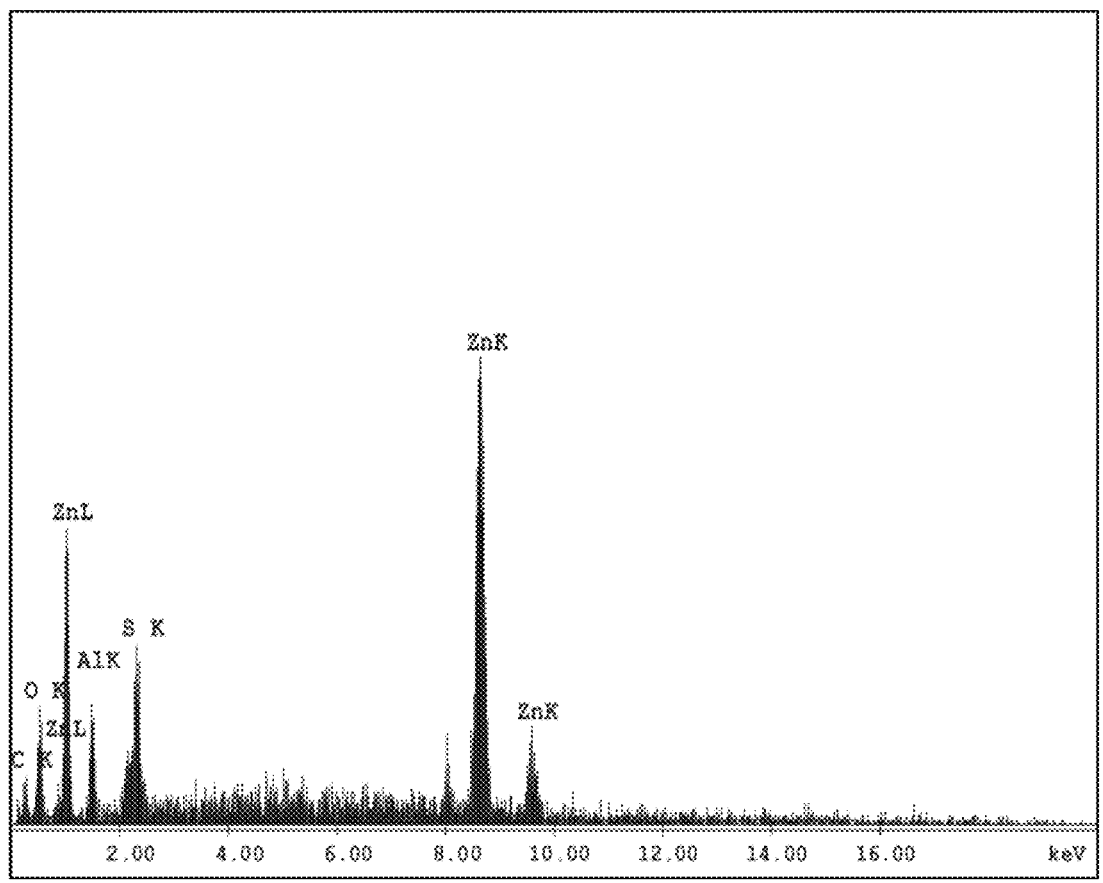
FIG. 7B is an energy-dispersive X-ray spectrum of the mercaptobenzothiazole-exchanged Zn—Al LDH composition of FIG. 7A.
Figure 8A:
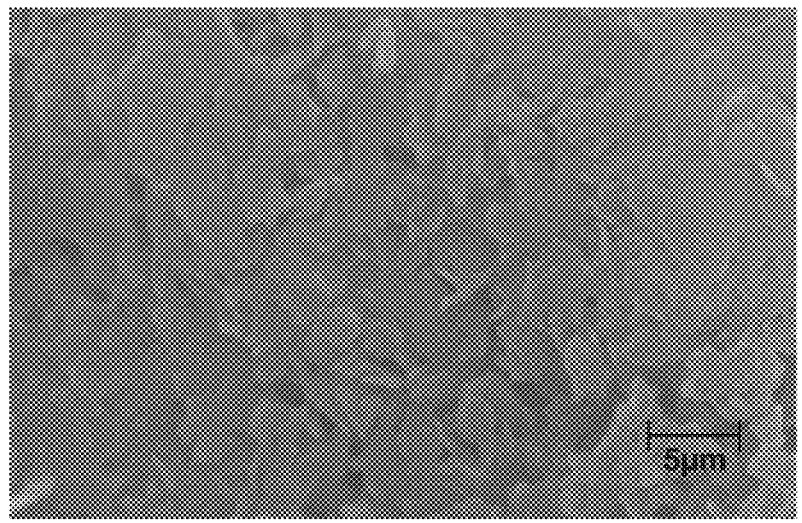
FIG. 8A is an SEM image of a vanadate-exchanged Zn—Al LDH composition as prepared by the process of FIG. 3.
Figure 8B:
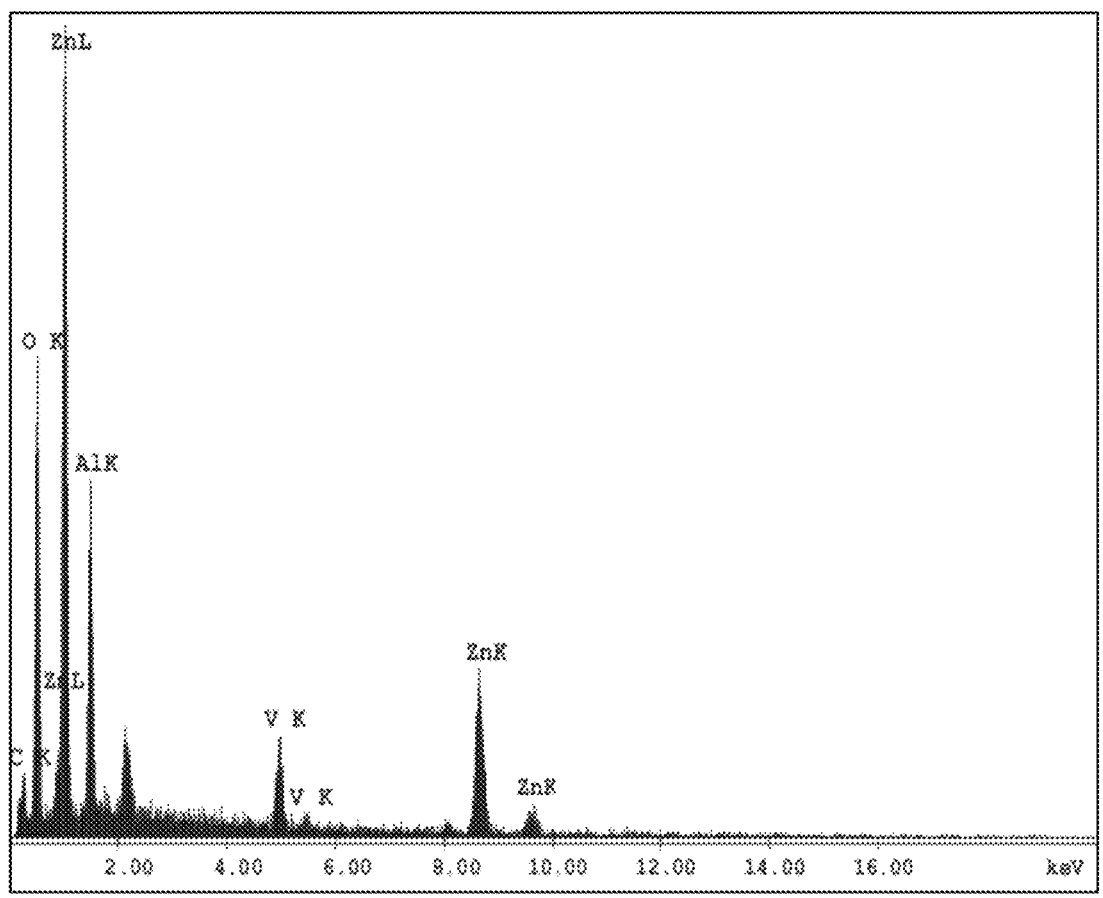
FIG. 8B is an energy-dispersive X-ray spectrum of the vanadate-exchanged Zn—Al LDH composition of FIG. 8A.

FIG. 6A is a scanning electron microscopy (SEM) image of a Zn—Al LDH composition as prepared by process 200 of FIG. 2, and FIG. 6B is an energy-dispersive X-ray spectra of the Zn—Al LDH composition. FIG. 7A is an SEM image of a mercaptobenzothiazole-exchanged LDH composition as prepared by process 300 of FIG. 3 (e.g., as described in Example 3), and FIG. 7B is an energy-dispersive X-ray spectra of the mercaptobenzothiazole-exchanged Zn—Al LDH composition. FIG. 8A is an SEM image of a vanadate-exchanged LDH composition as prepared by process 300 of FIG. 3 (e.g., as described in Example 3), and FIG. 8B is an energy-dispersive X-ray spectra of the vanadate -exchanged Zn—Al LDH composition.

Figures 9A, 9B, 9C, 9D:
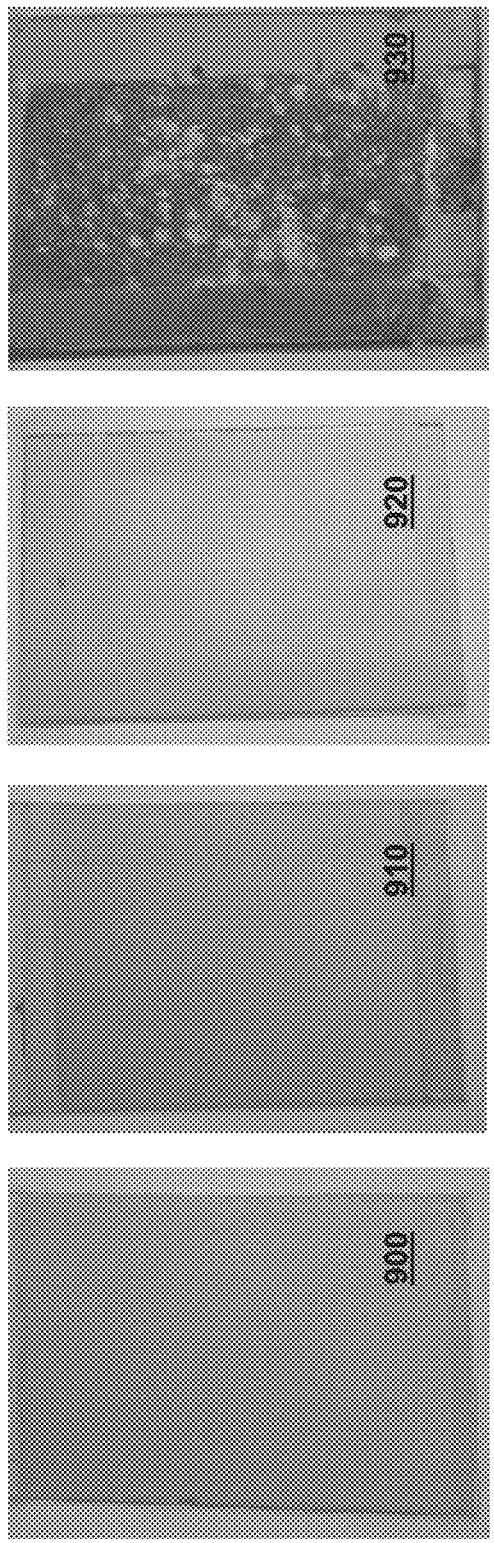
FIGS. 9A and 9B are images of sol-gel coated substrates formed by the process of FIG. 4 after a corrosion-resistance test.
FIG. 9C is an image of a chrome conversion coated substrate after a corrosion-resistance test.
FIG. 9D is an image of an uncoated substrate after a corrosion-resistance test.

FIG. 9A is an image of a sol-gel coated substrate 900, formed by the process of FIG. 4, after a corrosion-resistance test. Sol-gel coated substrate 900 has an organic CIM-containing sol-gel layer that includes a mercaptobenzothiazole-exchanged LDH composition as its organic corrosion inhibiting material formed on a substrate, and an inorganic CIM-containing sol-gel layer that includes a vanadate-exchanged LDH composition as its inorganic corrosion inhibiting material formed on the organic CIM-containing sol-gel layer. Sol-gel coated substrate 900 was exposed to a 5% salt spray. FIG. 9A shows sol-gel coated substrate 900 after 336 h of the salt spray test.

FIG. 9B is an image of a sol-gel coated substrate 910, formed by the process of FIG. 4, after a corrosion-resistance test. Sol-gel coated substrate 910 has an organic CIM-containing sol-gel layer that includes a phytic acid-exchanged LDH composition as its organic corrosion inhibiting material formed on a substrate, and an inorganic CIM-containing sol-gel layer that includes a vanadate-exchanged LDH composition as its inorganic corrosion inhibiting material formed on the organic CIM-containing sol-gel layer. Sol-gel coated substrate 910 was exposed to a 5% salt spray. FIG. 9B shows sol-gel coated substrate 910 after 336 h of the salt spray test.

FIG. 9C is an image of a chromated substrate 920, formed by chrome conversion coating, after a corrosion-resistance test. Chrome conversion coated substrate 920 was exposed to a 5% salt spray. FIG. 9C shows chrome conversion coated substrate 920 after 336 h of the salt spray test.

FIG. 9D is an image of an uncoated aluminum alloy substrate 930 after a corrosion-resistance test. Uncoated substrate 930 was exposed to a 5% salt spray. FIG. 9D shows uncoated substrate 930 after 336 h of the salt spray test, which was severely corroded.

Sol-gel coated substrate 900 shown in FIG. 9A and sol-gel coated substrate 910 shown in FIG. 9B had no corrosion. Chrome conversion coated substrate 920 shown in FIG. 9C, although not corroded, had discolored. Chrome conversion coating followed by applying a primer and paint is currently considered the state of the art for corrosion-resistant coatings for metal or metal alloy substrates. Accordingly, sol-gel coated substrates 900 and 910 shown in FIGS. 9A and 9B, respectively, advantageously have a corrosion resistance that is comparable or better than that of chrome conversion coated substrate 920.

Figure 10:
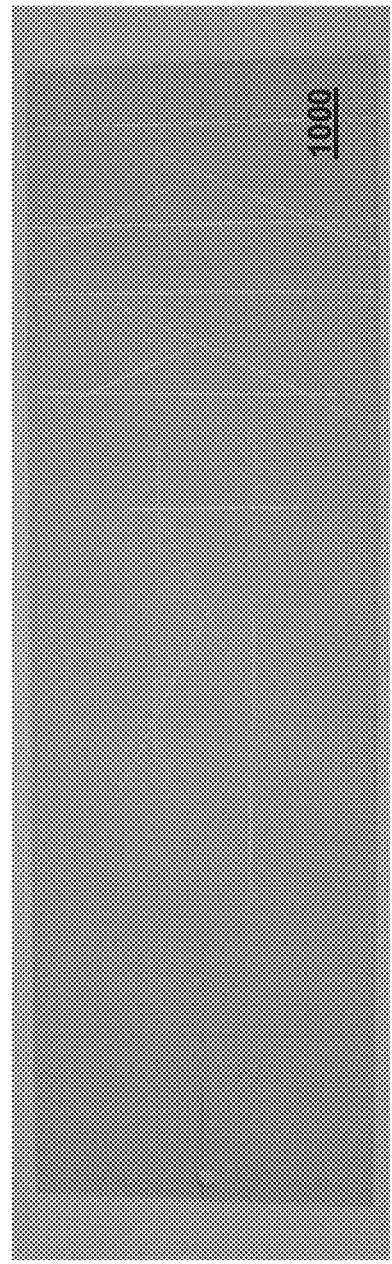
FIG. 10 is an image of a primer applied sol-gel coated substrate formed by the process of FIG. 4 after an adhesion test.

FIG. 10 is an image of a primer applied sol-gel coated substrate 1000 formed by process 400 of FIG. 4 after an adhesion test. A scribed wet tape adhesion test on primer applied sol-gel coated substrate 1000 was performed as follows. Primer applied sol-gel coated substrate 1000 was immersed in tap water for 24 hours. After 24 hours, primer applied sol-gel coated substrate 1000 was removed and blot dry with cheesecloth. Using a metal cutting tool (e.g., a razor blade, a scalpel, a knife, or other cutting tool), two parallel 2 inch long scratches were made, ¾ to 1 inch apart, through the coating and to the substrate. The parallel scratches were joined with two intersecting lines, or an "X" pattern. An adhesive tape was applied over the scratched pattern, and the tape was pressed against the test surface with firm hand pressure. (Alternatively, adhesive tape may be applied using a roller). One end of the tape was lifted such that a length of about 2 inches on that end of the tape was not in contact with the test surface. The minimum remaining length of the tape in contact with the test surface was approximately 4 inches. The lifted-up 2 inch segment of the tape was positioned to create an approximate 45 degree angle with the test surface. The remainder of the tape was removed by pulling up and back with an abrupt motion. For this adhesion test, if the primer comes off the substrate, it implies poor adhesion. If the primer does not come off the substrate, it implies good adhesion. As shown by the result in FIG. 10, the primer of sol-gel coated substrate 1000 did not come off. Thus, the sol-gel layers formed by process 400 of FIG. 4 advantageously have good adhesion to organic paint such as primer and/or paint.

When introducing elements of the present invention or exemplary aspects or embodiment(s) thereof, the articles "a," "an," "the," and "said" are intended to mean that there are one or more of the elements. The terms "comprising," "including," and "having" are intended to be inclusive and mean that there may be additional elements other than the listed elements. Although this invention has been described with respect to specific embodiments, the details of these embodiments are not to be construed as limitations. Different aspects, embodiments and features are defined in detail herein. Each aspect, embodiment or feature so defined may be combined with any other aspect(s), embodiment(s) or feature(s) (preferred, advantageous or otherwise) unless clearly indicated to the contrary. Accordingly, the scope of the invention is defined only by the following claims.

What is claimed is:

1. A CIM-containing sol-gel composition comprising:
    a corrosion inhibiting material (CIM); and
    a polymer composite of one or more alkoxysilanes, a zirconium alkoxide, and an organic acid,
   wherein the CIM comprises a Zn—Al layered double hydroxide (LDH) composition encapsulating a corrosion inhibiting compound.

2. The CIM-containing sol-gel composition of claim 1, wherein the corrosion inhibiting compound comprises an organic corrosion inhibiting compound selected from an imidazole, a triazole, a tetrazole, a thiazole, a thiadiazole, a benzimidazole, a benzotriazole, a benzothiazole, a quinoline, phytic acid, an organophosphonic acid, or an oil.

3. The CIM-containing sol-gel composition of claim 1, wherein the corrosion inhibiting compound comprises 1-(3-aminopropyl)imidazole, 1H-1,2,3-triazole, 4-methyl-4H-1,2,4-triazole-3-thiol, 1,2,4-triazole-3-carboxylic acid, 3-amino-1,2,4-triazole-5-thiol, 4H-1,2,4-triazol-4-amine, 3-mercapto-4-methyl-4H-1,2,4-triazole, 5-phenyl-1H-1,2,4-triazole-3-thiol, 1-methyl-1H-tetrazole-5-thiol, 1H-tetrazole-5-acetic acid, 4-methyl-1,3-thiazole-5-carboxylic acid, 1,3,4-thiadiazole-2,5-dithiol, 1H-benzimidazole-2-carboxylic acid, 1H-benzotriazole (BTA), 2-mercaptobenzothiazole (MBT), 8-hydroxyquinoline, phytic acid, an organophosphonic acid, a vegetable oil, or a combination thereof.

4. The CIM-containing sol-gel composition of claim 1, wherein the corrosion inhibiting compound comprises a salt of an oxyanion of a transition metal, a post-transition metal, a metalloid, or a polyatomic non-metal.

5. The CIM-containing sol-gel composition of claim 1, wherein the corrosion inhibiting compound comprises a vanadate, a molybdate, a tungstate, a phosphate, a manganate, a permanganate, an aluminate, or a combination thereof.

6. A method of preparing the CIM-containing sol-gel composition of claim 1, comprising:
    preparing a first solution comprising a first corrosion inhibiting compound;
    mixing a solution of a zinc salt and a solution of an aluminum salt to form a solution of zinc and aluminum;
    adding a solution of an alkali metal salt to the solution of zinc and aluminum to form a mixture;
    collecting the Zn—Al layered double hydroxide (LDH) composition from the mixture;
    adding the Zn—Al LDH composition to the first solution to form a precipitate comprising the corrosion inhibiting material (CIM);
    collecting the CIM from the first solution; and
    adding the CIM to a sol-gel composition to form the CIM-containing sol-gel composition.

7. The method of claim 6, wherein:
    the mixing to form the solution of zinc and aluminum comprises mixing a zinc nitrate solution and an aluminum nitrate solution and stirring under nitrogen purging, and
    the adding to form the mixture comprises adding a sodium nitrate solution to the solution of zinc and aluminum while maintaining a pH of about 8 to about 12 and stirring under nitrogen purging.

8. The method of claim 6, further comprising preparing the sol-gel composition.

9. The method of claim 8, wherein the preparing the sol-gel composition comprises:
    contacting a first alkoxysilane with water and an inorganic acid to form a first composition;
    contacting a zirconium alkoxide with a first organic acid to form a second composition;
    contacting the first composition with the second composition to form a third composition; and
    contacting one or more second alkoxysilanes and a second organic acid with the third composition to form the sol-gel composition, the sol-gel composition having a ratio of a number of moles of silicon to a number of moles of zirconium ($n_{Si}/n_{Zr}$) ranging from about 2 to about 10.

10. The method of claim 9, wherein the contacting to form the first composition comprises mixing the first alkoxysilane having the formula $R_A$-Si-$(R_B)_3$ with the water and the inorganic acid, wherein the $R_A$ is methacryloxyalkyl or glycidyloxyalkyl, and wherein the $R_B$ is a methoxy or ethoxy.

11. The method of claim 9, wherein the contacting to form the second composition comprises mixing a zirconium alkoxide having the formula $Zr\text{-}(R_C)_4$ with methacrylic acid (MAA), and wherein the $R_C$ is ethoxy, n-propoxy, iso-propoxy, n-butyloxy, or tert-butyloxy.

12. The method of claim 9, wherein the contacting to form the sol-gel composition comprises:
   adding one or more second alkoxysilanes each having the formula $R_D\text{-}Si\text{-}(R_E)_3$ to the third composition, wherein the $R_D$ is aryl, aminoalkyl, or glycidoxyalkyl, and wherein the $R_E$ is methoxy or ethoxy; and
   adding MAA and stirring.

13. The method of claim 6, wherein the adding the CIM to form the CIM-containing sol-gel composition comprises adding the CIM in an amount ranging from about 1 to about 10 parts by weight per 100 parts by weight of the sol-gel composition or ranging from about 1 to about 10 parts by weight per 100 parts by weight of a solid content of the sol-gel composition.

14. The method of claim 6, wherein adding the CIM to form the CIM-containing sol-gel composition comprises adding the CIM to a first sol-gel composition to form an organic CIM-containing sol-gel composition, wherein the first corrosion inhibiting compound is an organic corrosion inhibiting compound, and wherein the CIM is an organic CIM.

15. The method of claim 14, further comprising dispersing the organic corrosion inhibiting compound in a solvent to form the first solution.

16. The method of claim 14, further comprising forming an inorganic CIM-containing sol-gel composition.

17. The method of claim 16, wherein forming the inorganic CIM-containing sol-gel composition comprises:
   adding the Zn—Al LDH composition to a second solution comprising an inorganic corrosion inhibiting compound to form a precipitate comprising an inorganic CIM, the inorganic CIM comprising the inorganic corrosion inhibiting compound intercalated in the Zn—Al LDH composition; and
   adding the inorganic CIM to a sol-gel composition to form an inorganic CIM-containing sol-gel composition.

18. The method of claim 14, further comprising
   applying the organic CIM-containing sol-gel composition on a substrate to form an organic CIM-containing sol-gel layer;
   curing the organic CIM-containing sol-gel layer by UV radiation;
   applying the inorganic CIM-containing sol-gel composition on the substrate to form an inorganic CIM-containing sol-gel layer;
   curing the inorganic CIM-containing sol-gel layer by the UV radiation; and
   thermally curing a plurality of sol-gel layers comprising the organic CIM-containing sol-gel layer and the inorganic CIM-containing sol-gel layer to form a corrosion-resistant coating.

19. The method of claim 18, further comprising applying primer and/or paint on the plurality of sol-gel layers on the substrate, the plurality of sol-gel layers facilitating adherence of the primer or the paint to the substrate.

20. A corrosion-resistant coated product, comprising:
   a substrate; and
   a plurality of sol-gel layers on the substrate, wherein the plurality of sol-gel layers comprise:
      a corrosion inhibiting material (CIM); and
      a polymer composite of one or more alkoxysilanes, a zirconium alkoxide, and an organic acid, wherein the CIM comprises a Zn—Al layered double hydroxide (LDH) composition encapsulating a corrosion inhibiting compound.

* * * * *